United States Patent Office 3,515,575
Patented June 2, 1970

3,515,575
PROCESS OF DEACTIVATING AND COLLECTING PAINTS WITH A WATER CURTAIN
Roger F. Arnold, Norwood, Ohio, assignor to W. R. Grace & Co., New York, N.Y., a corporation of Connecticut
No Drawing. Filed Mar. 6, 1968, Ser. No. 710,719
Int. Cl. B01d 47/00
U.S. Cl. 117—102          7 Claims

ABSTRACT OF THE DISCLOSURE

An improvement in the process of deactivating and collecting paints with a water curtain in a water wash booth comprises maintaining in the water at least 0.5 p.p.m. of a water-soluble polymer having an average molecular weight of from 1,000 to 15,000,000 and having repeated groups with the formula

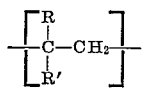

wherein R is a hydrogen or methyl group and R' is an amide or carboxyl group.

---

This invention relates to an improved process for deactivating and collecting paints with a water curtain in a water wash booth. In particular, this invention relates to the use of a water-soluble polymer in the water of a water wash booth to deflocculate paint over-spray particles, thereby increasing the action of water and other chemicals on these particles.

In summary, the process of this invention is an improvement in the method of deactivating and collecting paints with a water curtain in a water wash booth, the improvement comprising maintaining in the water at least 0.5 p.p.m. of a water-soluble polymer having an average molecular weight of from 1,000 to 15,000,000 and having repeating groups with the formula

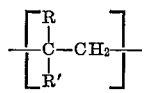

wherein R is a hydrogen or methyl group and R' is an amide or carboxyl group.

Many attempts have been made to increase the deflocculation of paint overspray in water wash booths by the use of various organic agents. Previous attempts have either been unsuccessful or have undesirable coexisting effects. These include excessive foaming, permanent suspension of the overspray, and rapid sinking of paint sludge, each of a detriment to the efficient operation of a spray booth. Furthermore, these previous attempts often required amounts of organic agents which were not economically feasible.

It is the object of this invention to provide a process for increasing the deflocculation of paint overspray in water wash booths which does not cause any significant foam, does not permanently suspend overspray particles, and does not promote sinking of paint sludge.

Water wash spray booths are used to control and limit the fumes, vapors, dusts, and paint overspray from paint spraying operations. The exhaust carrying such contamination is thoroughly washed with water to remove as much contamination as possible before being discharged to the atmosphere. For reasons of economy, the water used for washing in such systems is recirculated with essentially only water lost by evaporation being replaced. Under such conditions, the volatile water-insoluble fumes and vapors are discharged to the atmosphere. The dusts and paint overspray are captured by the water in the system.

This invention relates specifically to paint overspray that has been captured by the water. The paint spray leaving the spray gun is in a finely divided particulate condition and therefore loses much of its volatile thinners. This increases the viscosity of the paint, but does not change its nature, that is, the paint still retains its tackiness. When this paint is collected by water containing no paint booth compounds, it still acts like paint. It coats the surfaces of the paint booth and agglomerates into sticky masses.

Prior to this invention, a number of techniques have been applied to eliminate the tacky characteristics and agglomeration tendencies of the spray particles. A variety of attempted solutions are described in U.S. Pats. 2,739,903 and 2,968,638. Usually, a paint booth compound containing various alkalis, wetting agents, adsorbents, defoamers, and the like are dissolved in the water of a water wash booth system in concentrations sufficient to react with the surface of the paint particles to reduce its tackiness. As the concentration of paint in the system increases, it is usually necessary to add increasing concentrations of these agents in order to speed up the surface reaction with the paint particles and prevent agglomeration and sinking of the paint to the bottom of the sumps in the recirculating system.

The alkalis normally used to treat paint spray booth water include hydroxides, silicates, phosphates, polyphosphates, borates and carbonates of potassium and sodium. Suitable wetting agents include tannins, lignosulfonates, alkyl benzene sulfonate, ethylene oxide fatty alcohol condensates, rosin soaps and alkyl-phenoxy polyoxyethylene condensates. Absorbents used include talc, chalk, starch, bentonite, clay, colloidal silica, calcium silicate, magnesium silicate, aluminum silicate, and montmorillonites. Typical defoaming agents which can be used include petroleum distillates, waxes, fatty acid esters, polyoxyethylene polymers, fatty alcohols, polyoxyethylene and polyoxypropylene block polymers.

Suitable concentrations of these agents in water wash systems are shown in Table A.

TABLE A

|  | Concentrations, p.p.m. |
|---|---|
| Alkali | 50–27,000 |
| Wetting agents | 1–1500 |
| Absorbents | 10–15,000 |
| Defoaming agents | 5–6000 |

In the process of this invention, water-soluble polyelectrolytes are added to the water systems of the water wash spray booths in concentrations sufficient to disperse paint droplets in the aqueous system. The term "water soluble" is defined as including those polyelectrolytes which are soluble or colloidally dispersible in water. Water-soluble polyelectrolytes having molecular weights within the range of from about 1,000 to 15,000,000 can be employed. These polyelectrolytes, in general, are used in concentrations of at least 0.5 p.p.m. and preferably from 10 to 50 p.p.m. in the water system.

In general these polyelectrolytes have repeated groups with the formula

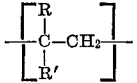

wherein R is a hydrogen or methyl group and R' is an amide or carboxyl group, and the water-soluble salts thereof.

Particularly suitable polyelectrolytic polymers for use in this invention are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides, and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The polymers of this type, having at least 50 mole percent of the acrylic or methacrylic acid derivatives, are preferred. Polymers of this type may be prepared directly by the polymerization of suitable monomers, or by the after-chemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example, carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to form amine-containing polymers. Similarly, copolymers of maleic anhydride and vinyl acetate may be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the solubilization effect of polyelectrolytic groups present. By other reactions nonhydrophilic polymers may be converted into lactam or amide containing polymers which are more hydrophilic. Polyvinyl alcohol, not in itself a polyelectrolyte, may be converted into polyelectrolyte by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers can be prepared by the amonolysis of ketone containing polymers, for example, polyvinyl methyl ketone. Similarly, active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups or derivatives thereof, phosphoric acid or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weight of at least 1,000.

Among the various polymers as described above and water-soluble salts thereof useful in the practice of the present invention, there may be mentioned hydrolyzed polyacrylonitrile and polyacrylamide,
sulfonated polystyrene,
acrylamine-acrylic acid copolymers,
polyacrylic acid,
½ calcium salt of hydrolyzed 1:1 copolymer of vinyl acetate-maleic anhydride,
hydrolyzed styrene-maleic anhydride copolymer,
ammonium polyacrylate,
sodium polyacrylate,
ammonium polymethacrylate,
sodium polymethacrylate,
diethanolammonium polyacrylate,
guanidinium polyacrylate,
dimethyl-aminoethyl polymethacrylate,
acrylamide-acrylonitrile copolymer,
methacrylic acid-dimethylaminoethyl methacrylate copolymer,
sodium polyacrylate-vinyl alcohol copolymer,
hydrolyzed methacrylic acid-acrylonitrile copolymer,
vinyl acetate-maleic anhydride copolymer,
vinyl formate-maleic anhydride copolymer,
vinyl methyl ether-maleic anhydride copolymer,
isobutylene-maleic anhydride copolymer,
styrene-maleic anhydride copolymer,
ethyl acrylate-maleic anhydride copolymer,
vinyl chloride-maleic anhydride copolymer,
hydrolyzed acrylonitrile-vinyl acetate copolymer,
hydrolyzed acrylonitrile-methacrylonitrile copolymer,
hydrolyzed acrylonitrile-methacrylonitrile-vinyl acetate terpolymer,
hydrolyzed acrylonitrile-methacrylic acid copolymer,
vinyl pyridine-acrylonitrile copolymer, etc.

Polymers containing cation active groups also are useful. Suitable compounds are, for example, ethyl acrylate and acrylamidopropyl-benzyldimethyl-ammonium chloride,
copolymers of methylolacrylamide and acrylamidopropylbenzyl-dimethylammonium chloride,
copolymers of butadiene and 2-vinyl pyridine, and certain quaternary compounds such as polydimethylaminostyrene quaternized with benzyl chloride, allyl chloride, etc., and quaternized copolymers of vinyl alcohol and morpholinylethyl-vinylether and the like.

The preferred polymers are polyacrylic acid, polymethacrylic acid, polyacrylamides, polymethacrylamides, including the hydrolysis products of the amide polymers, and water-soluble salts thereof having molecular weights within the range of from 1,000 to 200,000.

When the polyelectrolytes are added to the water system of paint spray booths according to this invention, effective dispersion of the paint overspray without significant foam is effected. The suspension of the overspray is not permanent, permitting flotation of the paint in the spray booth location where the spray booth design promotes collection of the particles. These results are accomplished with very small polymer concentrations.

The invention is further illustrated by the following specific but nonlimiting examples.

EXAMPLE 1

In this example, a 300 ml. portion of an aqueous solution of a mixture of alkali, wetting agent, absorbent, and defoaming agent in concentrations of 0.25 oz. per gallon was put into each of a series of pint glass jars with lids. In one jar (the control), no polymer was added. DAXAD 30, a sodium polymethacrylate having a molecular weight of about 10,000 available from W. R. Grace & Co. was added to the remaining jars. On an active basis, 1.12 p.p.m. of the polymer was added to one jar, 2.24 p.p.m. to the next, 3.36 to the third and increasing increments of 1.12 p.p.m. were added to the other jars up to and including 11.2 p.p.m. to the tenth jar. To two other jars, 16.8 p.p.m. and 56 p.p.m. of the polymer were added. To each of these jars, one ml. of a red pigmented epoxy primer was added, and each jar was then shaken vigorously for 10 seconds. The "control" jar showed only a slight pink tinge of color in the water, indicating only slight dispersion of the paint. In the other jars, the color intensity deepened with increasing polymer concentration. On standing, the dispersed paint floated to the top of the solution.

EXAMPLE 2

At an automobile assembly plant a paint booth composition consisting of 75 percent caustic soda, 16.0 percent sodium metasilicate, 6.5 percent sodium carbonate, and 2.5 percent hydrocarbon defoamer at a concentration of 2 oz. per gallon was giving poor results. The water in the paint spray booth system was clear of any paint. In this system, the spray booth was about 20 feet higher than the water reservoir of the system, the water reservoir being a baffled tank about 5 feet high and open at the top. Water was circulated by pump up to the spray booth and returned by gravity to the tank. Paint overspray was building up in the water collection trough of the spray booth and was not being carried to the tank. Hard manual labor was required to clean up the system because of this deficiency.

An initial charge of 30 p.p.m. (active basis) of DAXAD 30 was added to the system. Within minutes of this addition the returning water became colored with the paint currently being sprayed. After the color of the paint being used was changed, the color of the water changed to the new color within 15 minutes. When the first color was red and the second color was blue, the water in the system changed from red to purple to blue as the second paint was dispersed. The floating paint sludge also showed the same gradations of color as it collected on the surface of the water in the tank, and it was easily removed from the system.

Obviously, many modifications and variations of the invention as hereinabove set forth can be made without departing from the essence and scope thereof, and only such limitations should be applied as are indicated in the claims.

The invention claimed is:
1. In the process of deactivating and collecting paints with a water curtain in a water wash booth, the improvement consisting essentially of maintaining in the water a quantity of a water-soluble polymer having an average molecular weight of from 1,000 to 15,000,000 and having repeated groups with the formula

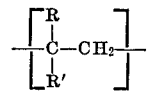

wherein R is a hydrogen or methyl group and R' is an amide or carboxyl group, the quantity of the polymer being sufficient to disperse paint droplets in the water wash system.

2. The process of claim 1 wherein the polymer is selected from the group consisting of polyacrylic acid, polymethacrylic acid, and water-soluble salts thereof.

3. The process of claim 2 wherein the polymer has a molecular weight of from 1,000 to 200,000.

4. The process of claim 1 wherein the polymer is selected from the group consisting of polyacrylamide, polymethacrylamide, hydrolysis products thereof, and water-soluble salts thereof.

5. The process of claim 4 wherein the polymer has a molecular weight of from 1,000 to 200,000.

6. The process of claim 1 wherein the water in the water wash booth contains up to 30,000 p.p.m. of a member selected from the group of a sodium hydroxide, sodium carbonate, sodium metasilicate, trisodium phosphate, sodium tetraborate, and mixtures thereof.

7. The process of claim 1 wherein at least 0.5 p.p.m. of the polymer is maintained in the water.

References Cited

UNITED STATES PATENTS

| Re. 22,615 | 3/1945 | Saunders et al. | |
| 2,208,647 | 7/1940 | Saunders et al. | 106—287 |
| 2,267,426 | 12/1941 | Saunders et al. | |
| 2,348,625 | 5/1944 | Hoffman. | |
| 2,362,964 | 11/1944 | Affleck. | |
| 2,585,407 | 2/1952 | Rives. | |
| 2,928,498 | 3/1960 | Schmid-Nisoli et al. | |
| 2,978,344 | 4/1961 | Parker et al. | |
| 3,173,879 | 3/1965 | Arnold et al. | 117—102 X |

ALFRED L. LEAVITT, Primary Examiner

J. R. BATTEN, JR., Assistant Examiner

U.S. Cl. X.R.

55—84